Feb. 20, 1962    G. H. GOWDY    3,021,636
SPLIT-TAIL SPINNING LURE-SPOON
Filed June 30, 1958
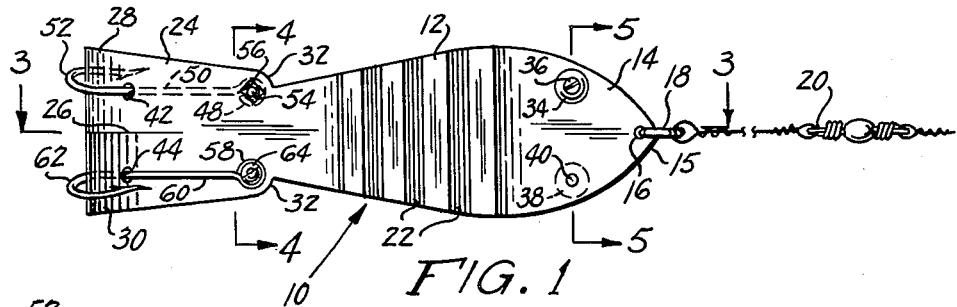
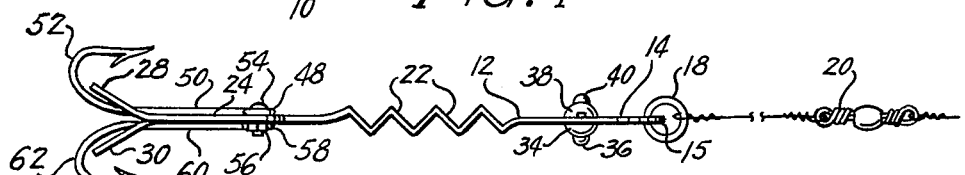
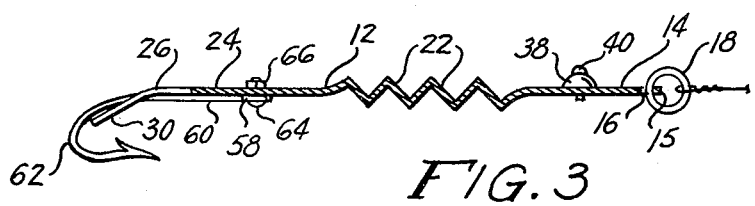
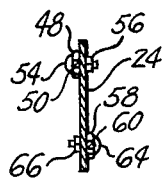 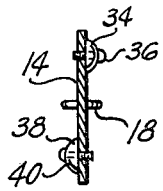
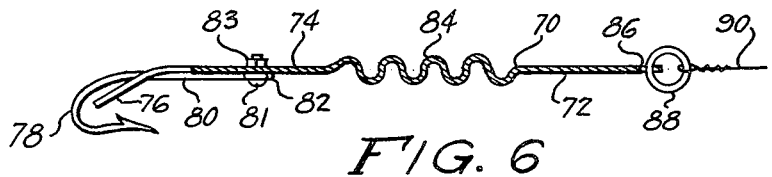
INVENTOR
GEORGE H. GOWDY
BY Gustave Miller
ATTORNEY

United States Patent Office 3,021,636
Patented Feb. 20, 1962

3,021,636
SPLIT-TAIL SPINNING LURE-SPOON
George H. Gowdy, 2411 2nd Ave. N.,
St. Petersburg, Fla.
Filed June 30, 1958, Ser. No. 745,693
1 Claim. (Cl. 43—42.34)

This invention relates to a fish lure, and it particularly relates to a spoon-type of fish lure.

It is one object of the present invention to provide a fish lure providing a very effective spinning action, this spinning action being easily adjustable.

Another object of the present invention is to provide a fish lure which is designed to give maximum or multireflection surfaces.

Another object of the present invention is to provide a fish lure which is equipped with a highly effective fish hook assembly.

Other objects of the present invention are to provide an improved fish lure, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawing in which:

FIG. 1 is an elevational view of a fish lure embodying the present invention.

FIG. 2 is a side edge view of the fish lure of FIG. 1.

FIG. 3 is a sectional view taken on line 3—3 of FIG. 1.

FIG. 4 is a sectional view taken on line 4—4 of FIG. 1.

FIG. 5 is a sectional view taken on line 5—5 of FIG. 1.

FIG. 6 is a sectional view, similar to FIG. 3, of a modified form of the invention.

Referring now in greater detail to the drawing wherein similar reference characters refer to similar parts, there is shown a fish lure, generally designated 10, which comprises a body portion 12 which may be of any desired size or dimensions and which may be constructed of any desired material such as brass, bronze, copper, vinyl resin, etc., and then plated with a surface coating of a highly reflecting substance. In addition to vinyl resin, any other desired plastic material may be used. Furthermore, if the body is constructed of an inherently reflecting material such as stainless steel, it is not necessary to use an additional reflecting coating.

At its forward end, the body 12 is provided with an enlarged, flat, rounded head portion 14 provided with an extreme nose end 15 in which is provided a hole 16. Extending through the hole 16 is a ring 18 to which is connected a swivel device 20 to the other end of which there is adapted to be connected a fishing line in the ordinary manner.

The central portion of the body 12 tapers gradually inward from head portion 14 and is provided with a series of transverse corrugations 22. These corrugations are preferably of alternating V-shape as indicated in FIGS. 2 and 3.

At the rear end of the body 12 there is provided a tail portion 24. The tail portion 24 is split at its rear end along the center, as at 26, to form two separate tail sections 28 and 30. At its fore end, the tail portion 24 is provided with inwardly sloping shoulders 32 connecting the rear end of the center section of the body 12 with the tail portion 24.

On the upper surface of the flat rounded head portion 14, adjacent one edge thereof, there is provided a half-bead 34 made either of colored or clear material as desired. The half-bead 34 may be held in place by a screw such as shown at 36 or by a bolt and nut, by a rivet or by any other desired means. On the opposite surface of the head portion 14 is provided a half-bead 38 similar in every way to half-bead 34 and similarly held in place by a screw, rivet or the like shown at 40. The half-bead 38 is positioned adjacent the opposite edge of the head portion 14 from half-bead 34. The half-beads 34 and 38, whether clear or colored, simulate the eyes of a fish while the screws, rivets or the like 36 and 40 simulate the corresponding pupils of these eyes. These beads 34 and 38 are so arranged that when the lure is spinning, it gives the illusion of one big eye which appears stationary.

At the tail portion 24, the two tail sections 28 and 30 form individual tail fins each of which is bent or curved in an opposite direction from the other (as best seen in FIG. 2). Each section or fin 28 or 30 is provided with a hole, indicated at 42 for fin 28 and 44 for fin 46. At the fore end of the tail portion 24, on the underside thereof, is fixed an eyelet 48 provided at one end of a hook stem 50 at the opposite end of which is formed a barbed hook 52. The eyelet 48 is held in place by a bolt 54 and nut 56. However, although a nut and bolt connection is indicated at 54 and 56, this is only one example of how such connection may be made; it being borne in mind that any other desirable and feasible type of connection may be used.

The stem 50, between the eyelet 48 and the hook 52, passes through the hole 42 in fin 28 and the hook 52 then curves down, under and around the outer edge of the fin 28 (as best seen in FIGS. 2 and 3).

On the upper surface of the tail portion 24, in an opposite transverse position from eyelet 48, there is fixed a similar eyelet 58 integral with a stem 60 at the other end of which is provided a barbed hook 62. The eyelet 58 is held in place by a bolt 64 and nut 66 similar to bolt 54 and nut 56; however, here, too, other desirable and feasible connecting means may be substituted.

At the rear end of the stem 60, the hook 62 passes in a curved arc up and around the rear edge of fin 30 after the stem 60 has first passed through hole 44 in the upwardly extending fin 30 (as best seen in FIG. 2).

In operation, with the lure 10 in the water at the end of a fishing line, the oppositely-extending fins 28 and 30 create a propeller effect whereby the entire lure is given a revolving or spinning action, thereby making the thin body 10 appear as though it were three-dimensional or tear-shaped, providing the illusion of a three dimensional bait while in use. The speed of rotation or spin may be increased or decreased by increasing or decreasing the inclination from the normal plane of the lure of each tail fin 28 or 30. Furthermore, during spinning of the lure, multiple reflections are created by the V-shaped corrugations in the body 12, in contrast with the usual type of lure where only two reflecting surfaces are provided, one on the top surface and one on the bottom. In addition, the oppositely-extending two hooks 52 and 62 are far more effective and may be individually used, in contrast to the ordinary 3-pronged grab hooks usually used.

In FIG. 6 there is shown a modified form of device which comprises a body 70 of substantially the identical form as that of FIGS. 1 to 5. It also includes a flat rounded head portion 72 and a flat tail portion 74 having oppositely-extending fins, one of which is shown at 76, the fin 76 corresponding to fin 28 in FIGS. 1 to 5. A hook 78 having a stem 80 and an eyelet 82 is fixed to the underside of tail portion 74 by a bolt 81 and nut 83 and extends through its downwardly-extending fin 76 similarly to the corresponding parts in FIGS. 1 to 5. There also is provided an upwardly-extending hook and upwardly-extending tail fin similar to those shown in FIGS. 1 to 5 (although these parts are not specifically shown).

All the structure of FIG. 6 so far described is generally identical with the device of FIGS. 1 to 5; however, this device of FIG. 6 differs from the device of FIGS. 1 to 5 in that the corrugations 84 are of general sinusoidal wave form consisting of alternate curvatures rather than of V-shape as in the device of FIGS. 1 to 5 described heretofore. Furthermore, no eye assembly, such as provided by half-beads 34 and 38, is provided thereby cutting down on the cost and increasing the ease of assembly. However, such eyes may be provided on this device of FIG. 6, if so desired. A hole 86, similar to hole 16, is provided in the nose end of head portion 72 and receives a ring 88 for connecting a swivel device 90 to the body 72 of the lure, all in similar manner to the device of FIGS. 1 to 5.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

A fish lure comprising a relatively flat body having a head portion, a center portion and an enlarged outwardly tapered tail portion having an inwardly extending shoulder on each side joining the adjacent side of said center portion, said head portion having means to connect it to a fishing line and said tail portion having a pair of fins, each extending in an opposite direction from the flat plane of said body, a pair of hooks fixed to said tail portion, each hook being associated with one of said fins, one of said hooks being curved in one direction from the flat plane of the body while the other of said hooks is curved in the opposite direction, each hook being integral with a stem having an eyelet releasably connected to said tail portion at laterally spaced points thereon, the stem of one of said hooks being positioned on one surface of said tail portion and the stem of the other of said hooks being positioned on the opposite surface of said tail portion, each stem extending through an opening in the corresponding fin and having its hook positioned on the opposite side of said opening, transverse corrugations being provided in said center portion, said center portion tapering inwardly from said head portion to said shoulders of said tail portion, and a simulated eye extending from each face of said head portion, each said eye comprising a half-bead simulating an eye iris, and a headed securing screw through said half-bead, said screw securing said half-bead to said head portion, said screw simulating an eye pupil, said eyes being located adjacent opposite edges of said head portion.

References Cited in the file of this patent

UNITED STATES PATENTS

| | | |
|---|---|---|
| D. 154,098 | Carr | June 14, 1949 |
| 524,494 | Thayer | Aug. 14, 1894 |
| 998,238 | Dineen | July 18, 1911 |
| 1,836,372 | Jordon | Dec. 15, 1931 |
| 2,003,976 | Raymond | June 4, 1935 |
| 2,778,144 | Jones et al. | Jan. 22, 1957 |
| 2,904,922 | Orebaugh | Sept. 22, 1959 |

FOREIGN PATENTS

| | | |
|---|---|---|
| 32,575 | Norway | June 27, 1921 |